Nov. 17, 1959 — A. E. ELLISON — 2,912,921
VACUUM TYPE COFFEE MAKER
Filed Feb. 10, 1955
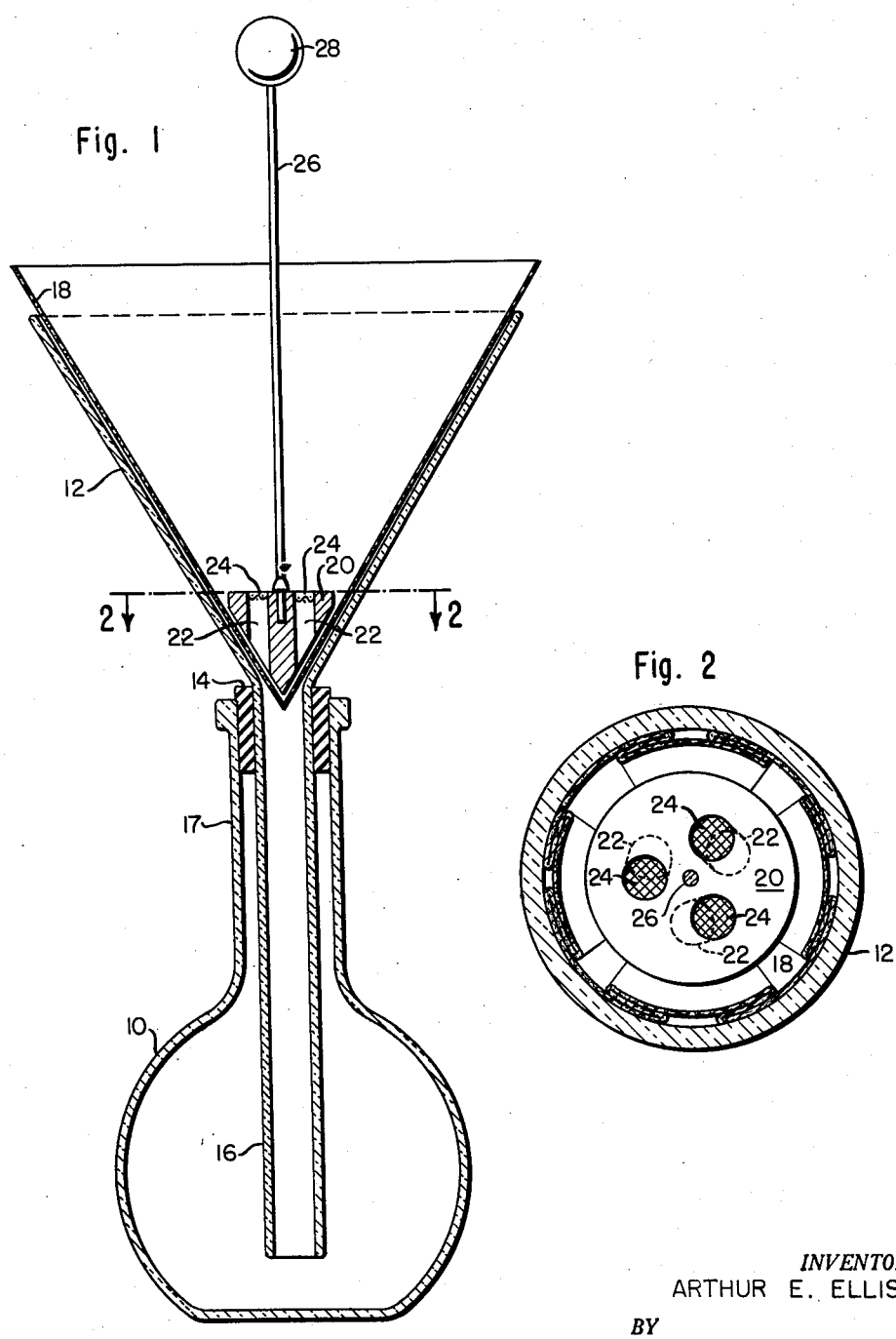
*INVENTOR.*
ARTHUR E. ELLISON
BY
Kenway, Jenney, Witter & Hildreth
ATTORNEYS

United States Patent Office 2,912,921
Patented Nov. 17, 1959

2,912,921

VACUUM TYPE COFFEE MAKER

Arthur E. Ellison, Medfield, Mass.

Application February 10, 1955, Serial No. 487,251

1 Claim. (Cl. 99—292)

This invention relates to household coffee making apparatus, and comprises new and improved apparatus of the vacuum type.

Such apparatus customarily includes a receiver or coffee pot of metal or glass having an opening at the top into which is fitted the stem and neck of a bowl or container in which the coffee grounds are placed. In operating such a device water is placed in the receiver, the upper bowl is fitted in place and filled with coffee grounds which are placed in direct contact with the bowl. When the water is boiled, the increase in pressure in the receiver forces the greater portion of the water upwardly through the stem and into the coffee grounds; when the temperature is thereafter reduced, the liquid is drawn back downwardly into the receiver, there being disposed in the neck of the upper container a ground glass plug, a textile filter, or other means to prevent the passage of coffee grains down through the stem and into the receiver. While apparatus of this general character can be operated to produce excellent coffee, the task of washing up afterward is relatively difficult and distasteful. The coffee grains, which can be washed out, flood the sink and the residue clings to the bowl and filter. The result is a mess which is annoying to the housewife.

There is on the other hand a type of coffee making apparatus comprising a funnel extending into a flask and carrying a filter. Coffee is made by filling the filter-lined funnel with coffee grounds and then pouring boiling water in from the top. Inasmuch as the filter rate is relatively slow, the operator must spend an unduly long time slowly pouring water into the funnel.

It is the primary object of my invention to facilitate the ease with which coffee of satisfactory quality can be made.

Another object of my invention is to eliminate from the household task of making coffee the unpleasant aspect of the washing operation required after the coffee has been made.

To these ends I have successfully combined the desirable features of the conventional vacuum type with those of the filter type, also eliminating the undesirable features inherent in each of them.

An important feature of my invention resides in the combination of a flask or receiver, a funnel having a stem and neck adapted to fit into the upper end of the receiver, a filter lining the interior of the funnel, and a conical member shaped to fit the bottom of the funnel and apertured vertically. This novel combination of elements functions as does the vacuum type described above, since the boiling water is forced upwardly through the stem and into the funnel where the coffee grounds are placed, passing upwardly through the filter and the apertures in the conical member; flow takes place in the reverse direction when the temperature pressure in the receiver is reduced. The conical member serves to hold the filter in place in the funnel against the upward thrust of the water. After coffee has been made, it is merely necessary to lift out the conical member and then remove the filter and coffee grounds simultaneously, the filter then serving as a bag to contain the coffee grounds so that they can be transported to a garbage pail or the like neatly and with dispatch. Cleaning the remainder of the apparatus is a simple and easy task.

In one aspect, therefore, my invention provides the first vacuum type coffee maker in which the coffee grounds are compartmentalized or segregated from the upper bowl. By using a filter paper complete disposal of the grounds can be made, or if preferred for economical or other reasons, partial disposal can be achieved by the use of a cloth filter cone.

In addition to providing improved apparatus useful in the household for making coffee, it should be pointed out that the apparatus of my invention lends itself to other uses. For example it provides simple and effective apparatus for brewing tea, a function incapable of performance by the conventional vacuum type of coffee maker.

These and other objects and features of my invention along with incident advantages will be better understood and appreciated from the foregoing description of one embodiment thereof selected for purposes of illustration and shown in the accompanying drawings in which:

Fig. 1 is a view in sectional elevation of a vacuum type coffee maker constructed in accordance with my invention, and Fig. 2 is a view in cross-section taken along sight lines 2—2 of Fig. 1.

The coffee maker illustrated generally resembles the vacuum type coffee makers in use today and comprises a glass flask 10 and a surmounted glass funnel 12. The stem 16 of the funnel extends downwardly through the neck 17 of the flask and a rubber stopper 14 engages both the neck and the stem to provide a seal between the two members.

A cone-shaped paper filter 18 lines the funnel. The point of the cone extends into the upper terminal portion of the stem and the walls of the filter cover the entire inner surface of the funnel chamber. A cone-shaped weight 20 mounted on the lower end of a rod 26 having a handle 28 lies on the apex of the filter to hold it in place. Passages 22 which extend through the weight are disposed at a slight angle from the perpendicular for reasons which will be made clear below. Each passage is provided with a screen 24 to prevent heavy coffee grounds or other matter from clogging the passages.

My coffee maker operates as follows: The flask is filled with the desired amount of water and then placed on the burner. When the water starts to boil, the funnel is mounted on the flask with the funnel stem extending downwardly into the water substantially to the bottom of the flask. It is important to make such that the rubber stopper seals the annular space between the neck and the stem. The filter paper and the weight are then dropped into the funnel and the ground coffee is poured into the filter lined funnel on top of the weight. The steam pressure in the flask drives the water upwardly through the stem of the funnel, through the apex of the filter and through the helical passages 22 in the weight. The water jetting out through the passages has sufficient angular momentum to swirl the coffee in the funnel and thereby expedite the brewing. After sufficient brewing, the coffee maker is removed from the burner, and the coffee is drawn back through the passages 22 and through the filter into the flask by the partial vacuum created as it cools. Finally, the weight is removed by means of the rod and handle knob, leaving the coffee grounds in the cone-shaped filter. The filter and the coffee grounds may then be discarded. Finally, the funnel and rubber stopper are removed from the neck of the flask to allow the coffee to be poured.

From the foregoing description, it will be appreciated that the filter in essence is an open ended coffee bag which permits the addition of desired amounts of coffee. After use, the filter and its contents may be removed from the funnel and thrown away, leaving a relatively clean funnel easily washable. The apparatus may be employed with equal effectiveness as a tea maker, merely by using tea in the filter instead of coffee.

The foregoing description has been limited to the embodiment of my invention illustrated in the drawing. Those skilled in the art will appreciate that a number of variations may be made of the embodiment described and illustrated without departing from the spirit of my invention. Therefore, I do not intend to limit my invention merely to the embodiment selected for purposes of illustration, but the scope of the invention should be determined by the appended claim and its equivalents.

What I claim as new and desire to secure by Letters Patent of the United States is:

A vacuum type coffee maker comprising, a sealed lower chamber for heating water, a funnel-shaped upper chamber having a stem portion communicating with said lower chamber, a conical paper filter completely lining said upper chamber and forming a disposeable compartment for holding a charge of coffee, a weight having a conical lower surface disposed in the apex of said conical filter and retaining said filter in place in said upper chamber, said weight having helical passages formed axially therethrough, screening members in said passages, and a rod and handle attached to said weight, said handle extending above said upper chamber to permit easy placement and removal of said weight.

References Cited in the file of this patent

UNITED STATES PATENTS

| | | |
|---|---|---|
| 912,634 | Warburton | Feb. 16, 1909 |
| 931,814 | Truman | Aug. 24, 1909 |
| 956,332 | Fuller | Apr. 26, 1910 |
| 1,472,896 | Alsop | Nov. 6, 1923 |
| 1,976,620 | Macbeth | Oct. 9, 1934 |
| 2,291,427 | Wolcott | July 28, 1942 |
| 2,313,112 | Wolcott | Mar. 9, 1943 |
| 2,409,226 | Schlumbohm | Oct. 15, 1946 |
| 2,460,735 | Carroll | Feb. 1, 1949 |
| 2,496,237 | Smith | Jan. 31, 1950 |
| 2,513,593 | Smith | July 4, 1950 |
| 2,738,722 | Schlumbohm | Mar. 20, 1956 |
| 2,746,376 | Hiscock | May 22, 1956 |

FOREIGN PATENTS

| | | |
|---|---|---|
| 24,685 | Great Britain | 1912 |